(12) United States Patent
De Jonge

(10) Patent No.: US 12,257,816 B2
(45) Date of Patent: *Mar. 25, 2025

(54) CARRIER MATERIAL COMPRISING A FIRST PART OF A FORM-FIT CONNECTION

(71) Applicant: FREUDENBERG PERFORMANCE MATERIALS B.V., Arnhem (NL)

(72) Inventor: Johannes De Jonge, Arnhem (NL)

(73) Assignee: FREUDENBERG PERFORMANCE MATERIALS B.V., Arnhem (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/284,988

(22) PCT Filed: Oct. 8, 2019

(86) PCT No.: PCT/EP2019/077166
§ 371 (c)(1),
(2) Date: Apr. 13, 2021

(87) PCT Pub. No.: WO2020/094317
PCT Pub. Date: May 14, 2020

(65) Prior Publication Data
US 2021/0323296 A1 Oct. 21, 2021

(30) Foreign Application Priority Data

Nov. 6, 2018 (EP) .................................... 18204549

(51) Int. Cl.
| | | |
|---|---|---|
| *B32B 38/00* | (2006.01) | |
| *B32B 3/06* | (2006.01) | |
| *B32B 5/02* | (2006.01) | |
| *B32B 5/06* | (2006.01) | |
| *B32B 5/26* | (2006.01) | |
| *B32B 7/022* | (2019.01) | |
| *B32B 37/15* | (2006.01) | |

(52) U.S. Cl.
CPC ............ *B32B 38/0004* (2013.01); *B32B 3/06* (2013.01); *B32B 5/022* (2013.01); *B32B 5/073* (2021.05);
(Continued)

(58) Field of Classification Search
CPC .. B32B 3/06; B32B 7/022; B32B 5/26; B32B 5/266; B32B 5/073; B32B 5/022;
(Continued)

(56) References Cited

U.S. PATENT DOCUMENTS

| | | |
|---|---|---|
| 5,639,542 A | 6/1997 | Howe et al. |
| 6,440,881 B1 | 8/2002 | Ercken |

(Continued)

FOREIGN PATENT DOCUMENTS

| | | |
|---|---|---|
| CN | 102317524 A | 1/2012 |
| CN | 106660303 A | 5/2017 |

(Continued)

OTHER PUBLICATIONS

Translation of JP11117171A. (Year: 1999).*
Nov. 25, 2019 International Search Report issued in International Patent Application No. PCT/EP2019/077166.

*Primary Examiner* — Catherine A. Simone
(74) *Attorney, Agent, or Firm* — Oliff PLC

(57) ABSTRACT

A carrier material includes at least a first thermoplastic fiber layer and a second thermoplastic fiber layer. At least a part of the first thermoplastic fiber layer and/or the second thermoplastic fiber layer at at least one boundary of the carrier material is removed, to provide a first part of a form-fit connection. The carrier material can be used in bituminous roofing membranes, roofing underlayment sheets, carriers for filter media, primary backings for tufted carpets and (cushion) vinyl floor coverings.

18 Claims, 6 Drawing Sheets

(52) U.S. Cl.
CPC .............. *B32B 5/266* (2021.05); *B32B 7/022* (2019.01); *B32B 37/15* (2013.01); *B32B 2307/54* (2013.01); *B32B 2307/732* (2013.01); *B32B 2419/04* (2013.01); *B32B 2419/06* (2013.01)

(58) Field of Classification Search
CPC .......... B32B 2307/54; B32B 2307/732; B32B 2419/04; B32B 2419/06; B32B 38/0004; B32B 37/15; Y10T 428/19; Y10T 428/195; Y10T 428/24777; E04C 2002/004
USPC .......................................................... 442/35
See application file for complete search history.

(56) References Cited

U.S. PATENT DOCUMENTS

| | | | |
|---|---|---|---|
| 11,858,247 B2 * | 1/2024 | Hermans | ................. B32B 7/027 |
| 2005/0013961 A1 | 1/2005 | Fossey et al. | |
| 2005/0282449 A1 | 12/2005 | Mehta et al. | |
| 2016/0201258 A1 * | 7/2016 | Van Der Zijpp | ..... B32B 27/304 442/35 |

FOREIGN PATENT DOCUMENTS

| | | | |
|---|---|---|---|
| DE | 22 22 086 A1 | | 11/1973 |
| FR | 2 852 029 A1 | | 9/2004 |
| JP | S53-054549 U | | 5/1978 |
| JP | 11117171 A | * | 4/1999 |
| JP | 2000-178864 A | | 6/2000 |
| JP | 2011-117171 A | | 6/2011 |
| JP | 2012-513546 A | | 6/2012 |
| KR | 101726859 B1 | | 4/2017 |
| WO | 82/02412 A1 | | 7/1982 |
| WO | 2004/090211 A2 | | 10/2004 |
| WO | 2010/068765 A1 | | 6/2010 |
| WO | 2015/055619 A1 | | 4/2015 |
| WO | 2015/165886 A1 | | 11/2015 |

\* cited by examiner

CARRIER MATERIAL COMPRISING A FIRST PART OF A FORM-FIT CONNECTION

The invention pertains to a carrier material and a method of manufacturing such a carrier material.

Carrier materials comprising thermoplastic fiber layers are known in the prior art. Such materials can be used in many applications such as for example bitumen roofing membranes, roofing underlayment sheets, carriers for filter media, primary backings for tufted carpets and (cushion) vinyl floor coverings.

Carrier materials are normally sold as rolled goods, whereby per type of carrier material and/or per application the length of every roll should preferably be the same. By the manufacturing process of e.g. bitumen roofing, tufted carpets and/or vinyl floor coverings the carrier material is used without additional treatment.

Therefore, a first carrier material, which is manufactured to e.g. a roofing membrane, has a termination in machine direction. For a continuous manufacturing process, e.g. manufacturing of bituminous roofing membranes, tufted carpets and/or vinyl floor coverings, a beginning of a second carrier material has to be attached by connecting to the termination of the first carrier material. Accordingly, the manufacturing process of the end product comprising the carrier material is disturbed as little as possible.

A carrier material has a rectangular shape (FIG. 10), thus the carrier material has four boundaries, two in machine direction ($4a/b$) and two in cross machine direction ($5a/b$). Further, the carrier material has a beginning ($4a$), which has to be understood as a boundary in machine direction and as a beginning of a (roll off) carrier material. Simultaneously, the carrier material has a termination ($4b$), which has to be understood as the opposing boundary of the beginning ($4a$) and the termination of a (roll off) carrier material. Furthermore, the carrier material has two boundaries in cross machine direction, wherein one boundary is on one side of the carrier material ($5a$) and one boundary is on the other side of the carrier material ($5b$).

To connect a first carrier material and a second carrier material, different parts of carrier materials are laid together butt joint wise or on top of each other (see FIGS. 1 and 2$a/b$) and connected to each other to create a continuous material. Such a connection between two parts of carrier materials results in a connecting area, comprising a first part and a second part of a connecting area, with higher material thickness and/or a connecting area having a density which is different to the remaining carrier material. Further, an adhesive material, i.e. adhesive tape or textile seam, could be added between the two parts, which also causes different local properties. This variation in thickness and other properties in the connecting area is not desired for many applications, e.g. bituminous roofing membranes, tufted carpets and/or vinyl floor coverings.

As the connecting areas have different properties in view of the remaining carrier material, the connecting areas will cause different properties in the end product, which have to be cut out of the end product, e.g. bituminous roofing membrane, tufted carpets and/or vinyl floor coverings. This causes additional waste, which has to be recycled or professionally disposed, which also causes additional costs.

Moreover, connecting areas with different properties can interrupt the production processes in which the carrier material is used.

WO 82/02412 A1 discloses a seamed nonwoven fabric consisting of at least two thermoplastic nonwoven fabric strips, wherein the edges of the strips are melt-shrunk and subsequently pressed together. As the material, which is melt shrunk, is not removed, the density of material at the edge portion, respectively at the seam, is increased. Also, the edge portions which passed a melting device and been molten and shrunk, have to be immediately pressed in contact with each other to perform a seam.

US 2005/0013961 A1 discloses a flexible fabric structure including a plurality of flexible fabric sections, including a plurality of plies of alternating fiber orientation. The plies of each fabric section are offset to each other. The fibers of each ply have solely one orientation in each ply, such that each ply have limited stability if forces are applied onto the fabric section or the plies.

The object of the present invention is to provide a carrier material, which can overcome or at least reduce the drawbacks of the prior art.

The object of the invention is solved by providing a carrier material comprising at least a first thermoplastic fiber layer and a second thermoplastic fiber layer, wherein the first thermoplastic fiber layer and the second thermoplastic fiber layer are nonwoven thermoplastic fiber layers, characterized in that at least a part of the first thermoplastic fiber layer and/or second thermoplastic fiber layer at at least one boundary of the carrier material is removed, to provide a first part of a form-fit connection.

Within the scope of the invention the term "thermoplastic fiber layer" has to be understood as a layer of fibers, wherein the fibers comprise thermoplastic polymer(s).

In a preferred embodiment, the fibers comprise at least 50 wt.-%, preferably at least 60 wt.-%, more preferably at least 70 wt.-%, even more preferably at least 80 wt.-%, even more preferably at least 90 wt.-%, even more preferably at least 95 wt.-%, and most preferably at least 97 wt.-% thermoplastic polymer(s) in view of the weight of all fibers in the thermoplastic fiber layer.

Further, the term "nonwoven" has to be understood as it is defined by the European Disposables and Nonwovens Association (EDANA): "A nonwoven is a sheet of fibers, continuous filaments, or chopped yarns of any nature or origin, that have been formed into a web by any means, and bonded together by any means, with the exception of weaving or knitting. Felts obtained by wet milling are not nonwovens." Thereby, it is commonly known that the fibers, continuous filaments, or chopped yarns in the nonwoven are randomly laid and do not follow any specific orientation.

Without being bound to theory, it is believed that by using a nonwoven according to the definition of the EDANA, a nonwoven can increase the stability against external forces which are applied on the nonwoven in any direction.

The carrier material has a length, a width, and a thickness. The length is oriented in machine direction and is the largest dimension of the carrier material. The width is oriented in cross machine direction and is the second largest dimension of the carrier material. Finally, the carrier material has a thickness, which is perpendicular to the length and to the width, and the thickness is the third largest dimension of the carrier material.

By having a length, a width, and a thickness, the carrier material has also a first main surface and a second main surface. The main surfaces are oriented in plane of the length and the width, and the main surfaces are parallel to each other and spaced apart from each other by the thickness of the carrier material.

The carrier material comprises a first and a second thermoplastic fiber layer. However, in a first embodiment, the first and second thermoplastic fiber layer of the carrier material are created from a single (starting) thermoplastic fiber layer.

By removing at at least one boundary of the carrier material at least a part of the first thermoplastic fiber layer and/or the second thermoplastic fiber layer, a first part of a form-fit connection is created. This first part of a form-fit connection can be connected to a second part of a form-fit connection created in a second carrier material like puzzle parts. Due to this form-fit connection thickness variation can be diminished (due to avoid double first and/or second fiber layers in a connecting area) and a kind of force-fit is created. Due to this kind of force-fit the permanent connection of the first carrier material and the second carrier material via (for example) consolidation techniques like calendaring, mechanical needling, hydroentanglement, ultrasonic bonding, thermal bonding, preferably by hot air, or by any combination thereof is easier (no slipping of different layers during consolidation) and/or a stronger connection is obtained.

To create such a first part of a form-fit connection two methods are possible: The first method would be to remove at least a part of the first thermoplastic fiber layer and/or second thermoplastic fiber layer at at least one boundary of the carrier material by an abrasive like method that uses a milling or grinder like technique such as skiving. The second method would include a separating step by cutting in plane into the carrier material, thus separating a part of the carrier material into an upper part and a lower part. Subsequently, cutting off the upper part or the lower part to remove at least a part of the first thermoplastic fiber layer and/or second thermoplastic fiber layer, thus, creating a first part of a form-fit connection. By these methods of creating a first part of a form fit connection, the carrier material is reduced in thickness at at least one of its boundaries. Preferably, the thickness is reduced to about a half of the original thickness.

Thereby, by removing at least a part of the first thermoplastic fiber layer and/or the second thermoplastic fiber layer at at least one boundary of the carrier material, a part of first thermoplastic fiber layer and/or a part of the second thermoplastic fiber layer is removed from the carrier material such that the density of the remaining part of the first thermoplastic fiber layer and/or the second thermoplastic fiber layer is maintained, i.e. is not increased. This has the effect, that the carrier material retains the ability to be impregnated by any suitable material such as bitumen or plastisol homogeneously, even in the region of the first part of a form-fit connection.

A further advantage of the carrier material is that by removing at least a part of the first thermoplastic fiber layer and/or the second thermoplastic fiber layer at at least one boundary of the carrier material, the carrier material according to the invention can be transported or stored for a long period of time without losing any physical properties such as strength or the ability to be attached to a second carrier material having a second part of a form fit connection and the ability to be impregnated by any suitably material such as bitumen or plastisol.

In a second embodiment, the carrier material comprises independent first and second thermoplastic fiber layers. This means a first thermoplastic fiber layer and a second thermoplastic fiber layer are laid together plane parallel to form the carrier material.

Also in this embodiment two methods exist to remove at least a part of the first thermoplastic fiber layer and/or the second thermoplastic fiber layer. The first method comprises a separating step to separate a part of the carrier material at at least one of its boundaries into an upper part and a lower part and subsequently cutting off the upper or lower part of the carrier material to remove at least a part of the first thermoplastic fiber layer and/or second thermoplastic fiber layer to obtain a first part of a form-fit connection. Thereby, it is not necessary that the separation is made between the originally independent first thermoplastic fiber layer and second thermoplastic fiber layer. The second method comprises an abrasive like method uses a milling or grinder like technique such as skiving, to remove a part of the first thermoplastic fiber layer and/or second thermoplastic fiber layer to obtain a first part of a form-fit connection.

Within the scope of the invention the term "connecting" or "connection" has to be understood as a connection or a procedure to establish a connection between two carrier materials, wherein at least one bonding technique is used. Such bonding techniques can be chemical bonding such as gluing by a liquid adhesive or an adhesive tape (also UV-activatable adhesive tape), melt-bonding by the application of heat e.g. by hot air, microwave irradiation, or calendaring, and mechanical bonding e.g. needling or stitching or hydroentanglement.

In a preferred embodiment, a part of the first thermoplastic fiber layer and/or second thermoplastic fiber layer at at least two boundaries of the carrier material is removed. This enables a carrier material to have two first parts of a form-fit connection, thus, the carrier material can be connected to a second carrier material and a third carrier material such that the connecting areas are formed having no variation, or at least less variation, in thickness and/or density in comparison to the remaining carrier material. This concept is also true for a carrier material, wherein a part of the first thermoplastic fiber layer and/or second thermoplastic fiber layer at more than two boundaries of the carrier material is removed.

Preferably, a part of the first thermoplastic fiber layer and/or second thermoplastic fiber layer of opposing boundaries of the carrier material is removed. Thus, the carrier material comprises two first parts of a form-fit connection.

The effect of comprising two first parts of a form-fit connection on opposing boundaries of a carrier material, is that the carrier material is able to be connected at a first boundary to a second carrier material and on a second boundary to a third carrier material, such that the connecting areas are formed having no variation, or at least less variation, in thickness and/or density in comparison to the remaining carrier material. The second and the third carrier material may also comprise two first parts of a form-fit connection. This enables also the second and the third carrier material to be connected to further carrier materials, having no variation, or at least less variation, in thickness and/or density in comparison to the remaining carrier material. Accordingly, a continuous manufacturing process of e.g. bitumen roofing membranes, tufted carpets and/or vinyl floor coverings could run endless.

Even more preferably, a part of the first thermoplastic fiber layer and/or second thermoplastic fiber layer of the boundaries of the beginning and the termination of the carrier material is removed. Thus, the carrier material comprises two first parts of a form-fit connection, one at the beginning and one at the termination of the carrier material.

The effect of comprising two first parts of a form-fit connection, one at the beginning and one at the termination of a carrier material, is that the carrier material is able to be connected at the beginning of the carrier material to a second carrier material and at the termination of the carrier material to a third carrier material, such that the connecting areas are formed having no variation, or at least less variation, in thickness and/or density in comparison to the remaining carrier material. The second and the third carrier material may also comprise two first parts of a form-fit connection at their beginning and terminations. This enables also the second and the third carrier material to be connected to further carrier materials, having no variation, or at least less variation, in thickness and/or density in comparison to the remaining carrier material. Accordingly, a continuous manufacturing process of e.g. bitumen roofing membranes, tufted carpets and/or vinyl floor coverings could run endless with these connected carrier materials (see FIG. 11)

In another preferred embodiment, a part of the first thermoplastic fiber layer and/or second thermoplastic fiber layer of the boundaries in cross machine direction of the carrier material is removed. Thus, the carrier material comprises two first parts of a form-fit connection, one at one side in cross machine direction and one at the other side in cross machine direction of the carrier material.

The effect of comprising two first parts of a form-fit connection, one at one side in cross machine direction and one at the other side in cross machine direction of a carrier material, is that the carrier material is able to be connected at the one side in cross machine direction of the carrier material to a second carrier material and at the other side in cross machine of the carrier material to a third carrier material, such that the connecting areas are formed having no variation, or at least less variation in thickness and/or density in comparison to the remaining carrier material. The second and the third carrier material may also comprise two first parts of a form-fit connection at their one sides and other sides in cross machine direction. This enables also the second and the third carrier material to be connected to further carrier materials, having no variation or at least less variation in thickness and/or density in comparison to the remaining carrier material. Accordingly, a continuous manufacturing process of e.g. bitumen roofing membranes, tufted carpets and/or vinyl floor coverings could run endless with these connected carrier materials (see FIG. 12), or a wider carrier material can be formed.

Preferably, for removing a part of the thickness of the first thermoplastic fiber layer and/or second thermoplastic fiber layer by an abrasive method, a skiving device is used.

In a preferred embodiment, the first thermoplastic fiber layer and the second thermoplastic fiber layer comprise the same type of thermoplastic fibers.

Within the scope of the present invention it is understood that the term fibers refers to both staple fibers and filaments. Staple fibers are fibers which have a specified, relatively short length in the range of 2 to 200 mm. Filaments are fibers having a length of more than 200 mm, preferably more than 500 mm, more preferably more than 1000 mm. Filaments may even be virtually endless, for example when formed by continuous extrusion and spinning of a filament through a spinning hole in a spinneret.

The fibers may have any cross sectional shape, including circular, trilobal, multilobal or rectangular, the latter exhibiting a width and a height wherein the width may be considerably larger than the height, so that the fiber in this embodiment is a tape. Furthermore, said fibers may be mono-component, bi-component or even multi-component fibers.

In a preferred embodiment, the thickness of a first part of a connecting area is 0% to 90%, preferably 20% to 80%, more preferably 35% to 70%, and most preferably 50% to 60% of the thickness of the remaining carrier material, where a part of the first thermoplastic fiber layer and/second thermoplastic fiber layer is removed.

Having a reduced thickness in a first part of the connecting area leads to no variation, or at least less variation, in thickness and/or density in the connecting area in comparison to the remaining carrier material. For performing a nearly perfect result, the form-fit connection at at least one boundary of the first part of the connecting area comprises a reduced thickness about 50% of the thickness of the carrier material.

One of the disadvantages of the prior art is that the thickness of the carrier material in the connecting area is increased, when two carrier materials are laid/connected together on top (e.g. see FIGS. 1 and 2a/b).

Preferably, the length and/or the width of the first thermoplastic fiber layer and the second thermoplastic fiber layer differ of at least 0.5 cm, preferably of at least 1.0 cm, more preferably of at least 2.0 cm.

By the difference in length and/or width of the first thermoplastic fiber layer and the second thermoplastic fiber layer, an contact area of the connecting area is increased in view of the prior art, e.g. by laying/connecting two carrier materials butt joint wise. The contact area is the area, where a first carrier material and a second carrier material comprise into contact in the connecting area. Due to the increased contact area of the connecting area, the possible form-fit connection with a second carrier material enables to build up a connection with increased connection strength.

In a preferred embodiment, the at least one boundary of the carrier material comprises at least two regions, wherein the regions comprise different thicknesses of the first part of the connecting area and/or different widths and/or lengths of the first thermoplastic fiber layer and second thermoplastic fiber layer.

In a further preferred embodiment, a scrim comprising warp threads and/or weft threads is comprised in the carrier material.

Preferably, the scrim is a woven scrim or a laid scrim. The scrim is able to improve tensile strength, to improve dimensional stability, i.e. by reducing elongation at a specific load applied to the carrier material, and/or to improve tear strength of the carrier material. In respect of the advantageous of using a scrim, applicant further refers to WO 2015/055619 A1.

Thereby, the scrim can be located between the first and second thermoplastic fiber layer or in the first or second thermoplastic fiber layer e.g. at 50% of the thickness of the carrier material.

If the scrim is located between the first and second thermoplastic fiber layer the scrim may have the ability to hold the fibers of the first and/or second thermoplastic fiber layer in their original thermoplastic fiber layer, such that the fibers of the first thermoplastic fiber layer are not entangled with the fibers of the second thermoplastic fiber layer and vice versa.

To obtain a connecting area, which has a thickness comparable to the remaining carrier material, it its advantageous to remove at least a part of the first and/or second thermoplastic fiber layer, which accounts for about 50% of the thickness of the carrier material in the connecting area. Therefore, for not damaging the scrim comprised in the carrier material, it would be advantageous that the scrim is not located at 50% of the thickness of the carrier material, preferably the scrim is located at 20%, more preferably at 30%, even more preferably at 40% and most preferably at 45% of the thickness of the carrier material.

If the scrim is located nearby 50% of the thickness (e.g. 40% or 45%) of the carrier material, the scrim will be in close proximity to a scrim of a second carrier material, if a second carrier material is connected to the carrier material in the connecting area. When using an adhesive for connecting the carrier material having a first part of a form fit connection with a second carrier material having a corresponding part of a form fit connection, due to the fact that the scrims of the carrier material and a second carrier material are close together in the connecting area, a lower amount of adhesive is necessary to secure a bonding between the scrims. By using less adhesive the impregnation of the carrier material, e.g. in manufacturing bituminous roofing membranes, tufted carpets and/or vinyl floor coverings, is improved and will prevent or at least reduce rejection of product (e.g. bituminous roofing membrane, tufted carpets and/or vinyl floor coverings).

In another preferred embodiment, the warp and/or weft threads of the scrim comprise high modulus fibers having a tensile modulus of at least 5 GPa, preferably of at least 10 GPa, more preferably of at least 15 GPa, even more preferably of at least 20 GPa, even more preferably of at least 25 GPa, even more preferably of at least 40 GPa, even more preferably of at least 50 GPa, and most preferably of at least 75 GPa.

In an embodiment, the warp threads of the scrim extending in the longitudinal direction of the carrier material comprise high modulus yarns, such as for example polyester yarns, such as polyethylene terephthalate (PET) yarns, polyamide yarns, such as polyamide-6 (PA6) yarns, glass yarns, aramid yarns or carbon yarns and/or other high modulus yarns or any combination thereof.

In another embodiment, the scrim is made of a glass warp and/or weft threads.

In a preferred embodiment a glass scrim is used which has the following specification:
33 warps threads per 25 cm and 21 weft threads per 25 cm
The warp threads comprise:
a titer of 34 tex
a strength of 110-130 N/5 cm
an elongation at break of 2.8-3.7%
The weft threads comprise:
a titer of 34 tex
a strength of 68-80 N/5 cm
an elongation at break of 2.5-3.0%

The scrim arranged in or between the first thermoplastic fiber layer and/or in the second thermoplastic fiber layer, may have been arranged at the center line of the thickness of the carrier material. By having a first part of the connecting area comprising a thickness of more than 50% of the remaining carrier material and of at most 85% preferably of at most 75%, even more preferably of at most 60% of the remaining carrier material, the risk of damaging the scrim is reduced to improve the dimensional stability of the carrier material. Further, due to the short distance between the scrim in the carrier material and a scrim in a second carrier material, which are connected together by the form-fit connection, enables an improved transfer of load in the connecting area.

Prior art carrier materials may comprise a scrim located at the center line of the thickness of the carrier material. When a connection between a first carrier material and a second carrier material is made by laying the first carrier material on top of the second carrier material (see FIGS. 1 and 2a/b), the distance between the scrim comprised in the first carrier material and the scrim comprised in the second carrier material is equal to the total thickness of the first carrier material or the second carrier material. The first carrier material and the second carrier material of such prior art carrier materials may be connected to each other by applying an adhesive tape at the connecting area between the first carrier material and the second carrier material and by applying heat and/or pressure at the connecting area to allow the adhesive to flow into the interstices between the fibers of the carrier material and the scrim. However, to obtain sufficient dimensional stability in such prior art carrier materials a relatively large amount of adhesive has to be applied to establish a sufficiently strong connection between both scrims, which adhesive becomes distributed throughout the entire thickness of the connecting area after applying heat and/or pressure. As a consequence, the connecting area cannot be impregnated, for example by bitumen or PVC plastisol, which leads to rejected material during manufacturing of e.g. bitumen membranes, tufted carpets and/or vinyl floor coverings as the connecting area will be visible in the bitumen membranes, tufted carpets and/or vinyl floor coverings.

In a preferred embodiment, the first thermoplastic fiber layer and/or second thermoplastic fiber layer comprise at least one type of mono-component fibers or bicomponent fibers.

In an embodiment, the first thermoplastic fiber layer and the second thermoplastic fiber layer of the carrier material comprise at least two mono-component fibers. In an embodiment, different types of mono-component fibers are used, wherein the at least two different types of mono-component fibers being preferably composed of polymers of different chemical construction having different melting points. It is preferred that the melting points of the at least two different polymers differ by at least 10° C., preferably by at least 20° C., more preferably the melting points differ by at least 50° C. Such a product could be thermally bonded, preferably by hot air, by subjecting the fiber of the carrier material in the connecting area to a temperature in the range of the melting point of the polymer with the lower melting point. By thermally bonding an additional adhesive for connecting the carrier material to a second carrier material is not required, thus, the properties of the connecting area of the carrier material are the same or at least similar to the properties of the remaining carrier material.

In an embodiment, the at least two thermoplastic fiber layers comprise bi-component fibers composed of two polymers of different chemical construction having different melting points.

Bi-component fibers are preferably fibers composed of two polymers of different chemical construction. A basic distinction is being drawn between three types of bi-component fibers: side-by-side types, core-sheath types and islands-in-the-sea types bi-component fibers. In an embodiment, the melting points of the two polymers building the bi-component fibers differ by at least 10° C., preferably at least 20° C., more preferably by at least 50° C. Such a carrier material comprising bi-component fibers, in particular when composed of side-by-side types, island-in-the-sea type and/or core-sheath type bi-component fibers could be thermally bonded, preferably by hot air, by subjecting the fibers of the carrier material in the connecting area to a temperature in the range of the melting point of the polymer with the lower melting point. By thermally bonding an additional adhesive for connecting the carrier material to a second carrier material is not required, thus, the properties of the connecting area of the carrier material are the same or at least similar to the properties of the remaining carrier material.

In a preferred embodiment the carrier material is predominantly made from core-sheath type bi-component fibers in the first and in the second thermoplastic fiber layers, preferably filaments. Predominantly is understood to mean that at least 50% of the fibers comprised in the thermoplastic fiber layers are core-sheath type bi-component fibers, preferably at least 75%, more preferably at least 90%, even more preferably at least 95%, most preferably 100%.

Preferably the core/sheath ratio in the core/sheath bi-component fibers lies between 95/5 Vol. % and 5/95 Vol. %. More preferably the core/sheath ratio lies between 50/50 Vol. % and 95/5 Vol. %.

In an embodiment, the sheath of the bi-component fibers comprises a polymer of a group of polymers comprising polyamides, polyolefins, halogenated polyolefins, polyesters, polyethers, polyimides, polysulfides and copolymers or mixtures thereof.

In another embodiment, the core of the bi-component fibers comprises a polymer of a group of polymers comprising polyolefins, halogenated polyolefins, polyamides, polyesters, polyethers, polyimides, polysulfides and copolymers or mixtures thereof.

In another embodiment, the sheath of the core/sheath bi-component fibers consists mainly of a polyamide, preferably a polyamide-6 (PA6), and the core consists mainly of a polyester, preferably a polyethylene terephthalate (PET), for example for bitumen membranes, tufted carpets or vinyl flooring.

In another embodiment, the sheath of the core/sheath bi-component fibers consists mainly of a polyolefin, preferably a polypropylene, and the core consists mainly of a polyester, preferably a polyethylene terephthalate (PET), for example for tufted carpets or filter media.

In another embodiment, the sheath of the core/sheath bi-component fibers consists mainly of a polyester, preferably a co-polyester (co-PET), and the core consists mainly of a polyester, preferably a polyethylene terephthalate (PET), for example for bitumen membranes, tufted carpets, vinyl flooring or filter media.

In a preferred embodiment, the first thermoplastic fiber layer and/or the second thermoplastic fiber layer are nonwoven layers of fibers and/or three dimensional mats of extruded entangled filaments.

The carrier material may comprise any type of nonwoven, such as for example staple fiber nonwovens produced by well-known processes, such as carding processes, wet-laid processes or air-laid processes or any combination thereof. The carrier material may also comprises a nonwoven composed of filaments produced by well-known spunbonding processes wherein filaments are extruded from a spinneret and subsequently laid down on a conveyor belt as a web of filaments and subsequently bonding the web to form a nonwoven layer of fibers, or by a two-step process wherein filaments are spun and wound on bobbins, preferably in the form of multifilament yarns, followed by the step of unwinding the multifilament yarns and laying the filaments down on a conveyor belt as a web of filaments and bonding the web to form a nonwoven carrier material of fibers.

Preferably, the fibers in the at least first and/or second thermoplastic fiber layer of the carrier material are filaments in order to provide higher tensile strength and/or higher tear strength to the carrier material and/or to the final (impregnated) product, such as for example a bitumen roofing membrane, a roofing underlayment sheet, a carrier for filter media, a tufted carpet or a (cushion) vinyl floor covering.

The at least first and/or second thermoplastic fiber layer of the carrier material may be composed of thermoplastic fibers for at least 50 wt. % of the total weight of fibers in the carrier material, preferably for at least 75 wt. %, more preferably for at least 90 wt. %, even preferably for at least 95 wt. %. Increasing the amount of thermoplastic fibers in the at least first thermoplastic fiber layer and/or second thermoplastic fiber layer increases the tensile strength and/or tear resistance and decreases the flexibility of the carrier material and/or the final (impregnated) product.

In an embodiment the at least first and/or the second thermoplastic fiber layer of the carrier material are composed for 100 wt. % of thermoplastic fibers of the total weight of the carrier material.

The thermoplastic polymer from which the thermoplastic fibers in the at least first and/or second thermoplastic fiber layer may be composed of any type of thermoplastic polymer capable of withstanding elevated temperatures such as for example encountered in manufacturing processes for bitumen roofing membranes, roofing underlayment sheets, carrier for filter media, tufted carpets and (cushion) vinyl floor coverings. The thermoplastic fibers may comprise a polyolefin, such as polyethylene (PE) or polypropylene (PP), a halogenated polyolefin, such as polytetrafluorethylene (PTFE) or polyvinylidene difluoride (PVDF), a polyester, such as for example polyethylene terephthalate (PET) (based either on DMT or PTA), polybutylene terephthalate (PBT), polytrimethylene terephthalate (PTT), polyethylene naphthalate (PEN) and/or polylactic acid (PLA), a polyimide; such as for example polyamide-6 (PA6), polyamide-6,6 (PA6,6) and/or polyamide-6,10 (PA6,10), polyimides (PI), polysulfides (PS) such as polyphenylenesulfide (PPS), polyethyleneimide (PEI) and/or polyoxymethylene (POM) and/or any copolymer or any blend thereof.

In an embodiment, a three dimensional mat of extruded entangled filaments can be provided by providing filaments and collecting the filaments into a three-dimensional structure by allowing the filaments to bend and to come into contact with each other, preferably in a molten state.

Bending of the filaments can for example be initiated by collecting the filaments into a water bath. U.S. Pat. No. 5,639,543 A discloses an example of such a three-dimensional random mat of entangled extruded filaments. The bending of the filaments is random and does not result in an array of particular shapes.

In a more preferred embodiment, the filaments of the three dimensional mat of extruded entangled filaments are thermally bonded at their crossing points, thus forming an entangled structure of extruded filaments shaped in three dimensions. Most preferably, the filaments of the three dimensional mat of extruded entangled filaments are still in their molten state when collected on a profiled surface to form a partly interpenetrated melt-bonding at their crossing points. By solidification of the interpenetrated filaments on a profiled surface, a three-dimensional mat of extruded entangled filaments is formed, which is consolidated, thus having, a high void volume.

Preferably, the surface on which the filaments are collected is profiled such that the three-dimensional structured mat of filaments is shaped into a three-dimensional form which comprises hills and valleys, hemispheres, positive and/or negative cuspates, cups and/or waffles, pyramids, U-grooves, V-grooves, cones and/or cylinders capped with a hemisphere.

The void volume of the three dimensional mat of extruded entangled filaments may be at least 50 vol. %, preferably at least 75 vol. %, more preferably at least 85 vol. %, even more preferably at least 90 vol. %, most preferably at least 95 vol. %.

Preferably, the three-dimensional structured mat of extruded entangled filaments which has a thickness in the range of 5 to 100 mm, preferably 5 to 50 mm, determined in accordance with ISO 9864:2014.

The diameter of the extruded entangled filaments in the three-dimensional structured mat of extruded entangled filaments may be varied widely. Preferably, the extruded entangled filaments in the three-dimensional structured mat of extruded entangled filaments have an average diameter in the range of 100 µm to 2000 µm, more preferably in the range of 200 µm to 1500 µm, even more preferably in the range of 300 µm to 1100 µm, most preferably in the range of 500 µm to 900 µm, measured with a Mitutoyo micrometer, the circular contacting surface having a diameter of 6.35 mm and with an applied load of 5N.

The extruded entangled filaments of the three dimensional mat of extruded entangled filaments of the at least first thermoplastic fiber layer and/or the second thermoplastic fiber layer may be composed of any suitable thermoplastic polymer or blend of thermoplastic polymers. The extruded entangled filaments may comprise a polyolefin, such as polyethylene (PE) or polypropylene (PP), a halogenated polyolefin, such as polytetrafluorethylene (PTFE) or polyvinylidene difluoride (PVDF), a polyester, such as for example polyethylene terephthalate (PET) (based either on DMT or PTA), polybutylene terephthalate (PBT), polytrimethylene terephthalate (PTT), polyethylene naphthalate (PEN) and/or polylactic acid (PLA), a polyamide, such as for example polyamide-6 (PA6), polyamide-6,6 (PA6,6) and/or polyamide-6,10 (PA6,10), polyimides (PI), polysulfides (PS) such as polyphenylenesulfide (PPS), polyethyleneimide (PEI) polyoxymethylene (POM), thermoplastic elastomers (TPE) such as thermoplastic polyurethanes (TPU), and/or any copolymer or any blend thereof.

Preferably, the carrier material manufactured according to the method of manufacturing can also comprise the properties of the embodiments described above.

The object of the invention further solved by a method of manufacturing a carrier material comprising the following steps:
 a. Supplying a carrier material comprising at least a first thermoplastic fiber layer and a second thermoplastic fiber layer
 b. Removing at least a part of the first thermoplastic fiber layer and/or second thermoplastic fiber layer at at least one boundary of the carrier material, and
 c. Optionally rolling up the carrier material.

In a preferred embodiment of the method, the removing of step b is made by skiving or splitting and cutting. Removing of at least a part of the first thermoplastic fiber layer and/or second thermoplastic fiber layer can be performed with a skiving-machine of the Fortuna GmbH.

In another preferred embodiment of the method, the removing of at least a part of the first thermoplastic fiber layer and/or the second thermoplastic fiber layer is performed, such that the thickness of a first part of a connecting are is 0% to 90%, preferably 20% to 80%, more preferably 35% to 70%, and most preferably 50% to 60% of the thickness of the remaining carrier material.

Preferably, the length and/or the width of the first thermoplastic fiber layer and/or the second thermoplastic fiber layer differs of at least 0.5 cm, preferably of at least 1.0 cm, more preferably of at least 2.0 cm.

In a preferred embodiment of the method, the carrier material comprises a scrim preferably located between the first thermoplastic fiber layer and the second thermoplastic fiber layer.

In a further preferred embodiment of the method, the scrim comprises warp threads and/or weft threads, wherein the scrim is preferably a woven or a laid scrim.

In another preferred embodiment of the method, the first thermoplastic fiber layer and/or the second thermoplastic fiber layer are nonwoven layers of fibers and/or three dimensional mats of extruded entangled filaments.

The carrier materials and its above described embodiments can be used in different applications having its advantageous properties. Preferably, the carrier material is used in bituminous roofing membranes, roofing underlayment sheets, carriers for filter media, primary backings for tufted carpets and (cushion) vinyl floor coverings.

The invention is described further via the figures.

BRIEF DESCRIPTION OF THE DRAWINGS

FIGS. 1 and 2 (a+b) show schematically a combination of wo parts of a carrier material of the prior art.

In FIG. 1 a connection of a first part A of a connected carrier material 1 and a second part B of a connected carrier material 1 is schematically shown (prior art). The first part A has a first thermoplastic fiber layer A1 and a second thermoplastic fiber layer A2. The second part B has also a first thermoplastic fiber layer B1 and a second thermoplastic fiber layer B2. For connecting the first part A and the second part B in a connecting area 3 the first part A is laid on top of the second part B. In the connecting area 3 four thermoplastic fiber layers are arranged. Due to this, the thickness and weight of the connected carrier material 1 increases in the connecting area 3.

FIG. 3 shows a side view of a carrier material 1 comprising a first thermoplastic fiber layer A1 and a second thermoplastic fiber layer A2. The first thermoplastic fiber layer A1 of the first part A has a different length than the second thermoplastic fiber layer A2. Due to this the carrier material 1 forms a first part of a form fit connection.

FIG. 4 shows an embodiment of the present disclosure with more than two thermoplastic fiber layers in the carrier material 1. The carrier material 1 comprises a first thermoplastic fiber layer A1, a second thermoplastic fiber layer A2 and a third thermoplastic fiber layer A3. The length of the first thermoplastic fiber layer A1 differs from the length of the second and third thermoplastic fiber layer A2, A3. The carrier material 1 forms also a first part of a form fit connection, thus, the present invention also works for carrier materials comprising more than two thermoplastic fiber layers in one part. It should be understood, that one or more of the layers A1, A2, A3, could be made of other materials than fibers (for example foils).

Figure 1:
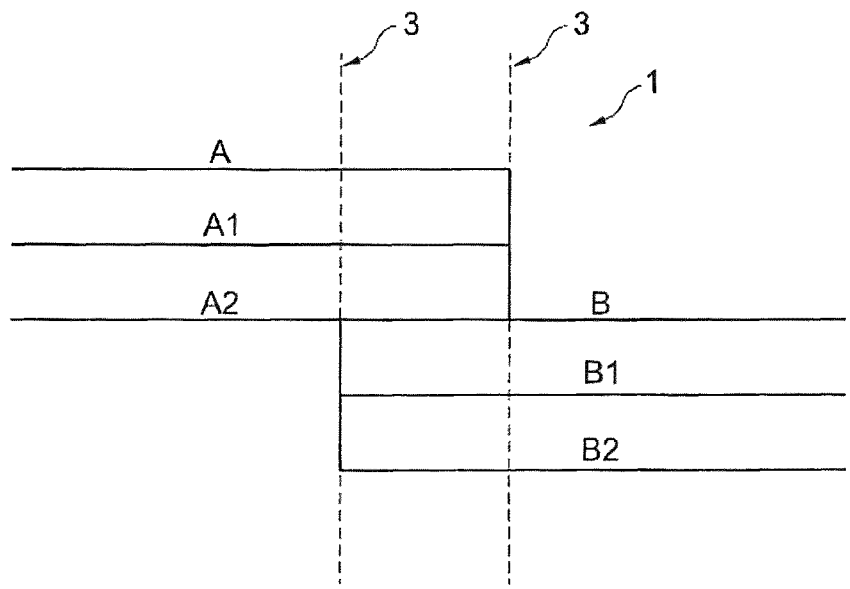
Figure 2A:
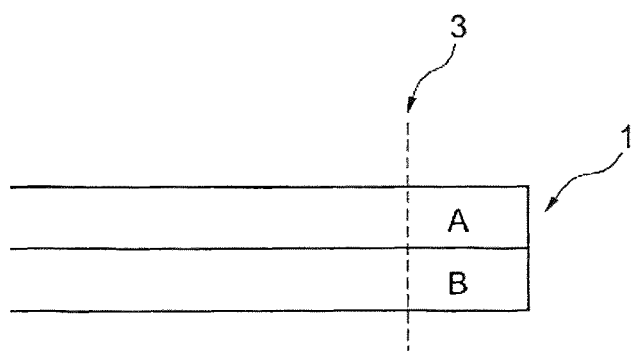
In FIGS. 2A and 2B an alternative embodiment of the prior art is shown. The carrier material 1 comprises a first part A with a single thermoplastic fiber layer and a second part B with a single thermoplastic fiber layer. Part A is laid on top of part B and then both parts A, B are permanently consolidated together, for example by using a hot wire or an ultrasonic bonding/cutting step to simultaneously cut and consolidate part A and part B together. Thereafter part A and part B are folded open, whereby they are connected in the connecting area 3. Also in this embodiment the thickness (and weight) of the carrier material 1 is increased in the connecting area 3. Furthermore, the strength of the carrier material at the connecting area is lower than in the remainder of the carrier material.
Figure 2B:
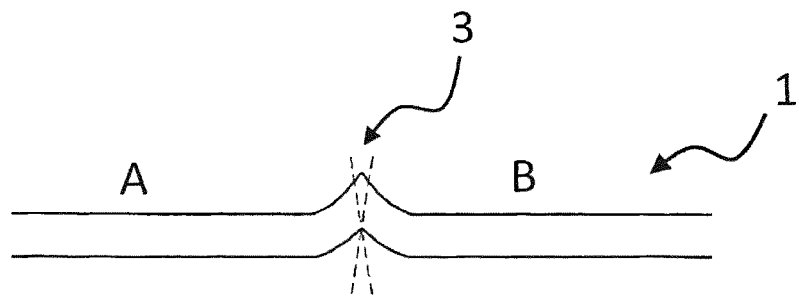
Figure 3:
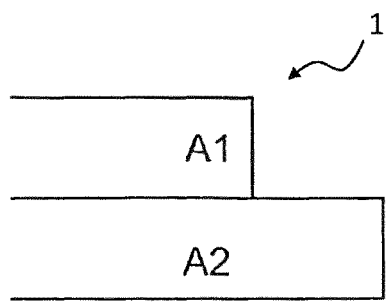
FIG. 3 shows schematically a side view of a carrier material.
Figure 4:
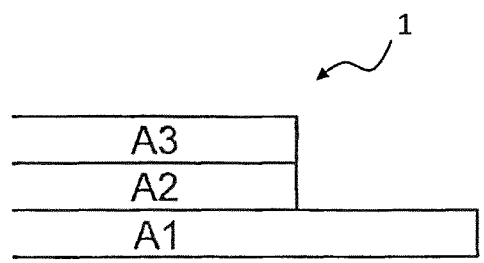
FIGS. 4 to 8 show schematically side views of different embodiments of the carrier material.
Figure 5:
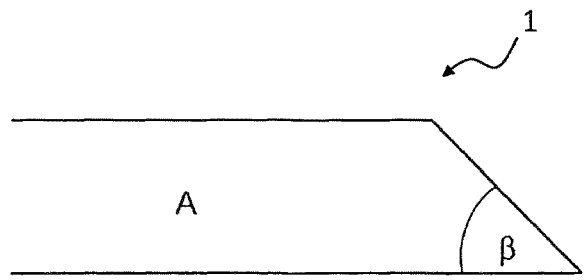

FIG. 5 shows a sideview of a carrier material having inclined layer boundary with an angle β. The carrier material 1 with the inclined layer boundary forms also a first part of a form fit connection.

Figure 6:
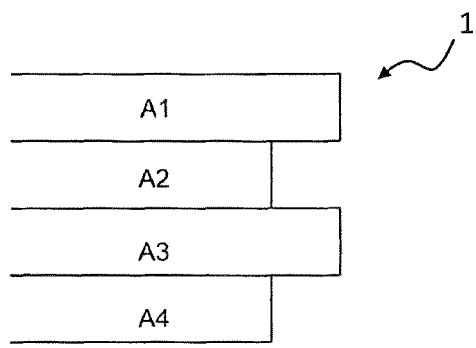

FIG. 6 shows a sideview of a carrier material 1 comprising four thermoplastic fiber layers (A1-A4). The first thermoplastic fiber layer A1 has a different length to the second thermoplastic fiber layer A2. Subsequently, the second thermoplastic fiber layer A2 has a different length to the third thermoplastic fiber layer A3 and also the third thermoplastic fiber layer A3 to the fourth thermoplastic fiber layer A4. The differences in length between the thermoplastic fiber layers are alternating, so that a zipper like form is obtained. Thereby, the even numbered layers A2 and A4 and/or the uneven numbered thermoplastic fiber layers A1 and A3 do not need necessarily the same lengths. Accordingly, the carrier material 1 also forms a first part of a form-fit connection.

Figure 7:
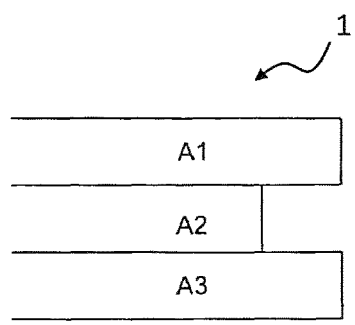

FIG. 7 shows a sideview of a carrier material having three thermoplastic fiber layers (A1-A3). The first thermoplastic fiber layer A1 has a different length to the second thermoplastic fiber layer A2. Subsequently, the second thermoplastic fiber layer A2 has a different length to the third thermoplastic fiber layer A3. The differences in length between the thermoplastic fiber layers are alternating, so that a zipper like form is obtained. Thereby, the uneven numbered layer A1 and A3 do not need necessarily the same lengths. Accordingly, the carrier material 1 also forms a first part of a form-fit connection.

Figure 8:
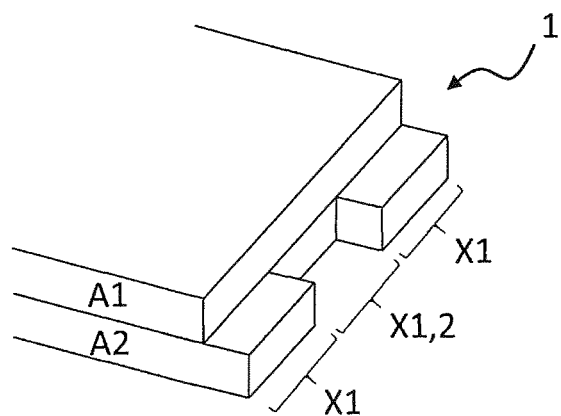

FIG. 8 shows a schematically perspective view of a carrier material having two thermoplastic fiber layers (A1, A2). In the regions X1, the length of the first thermoplastic fiber layer A1 is different to the length of the second thermoplastic fiber layer, wherein in the X1,2 region the length of the first thermoplastic fiber layer A1 is equal to the length of the second thermoplastic fiber layer A2. Accordingly, the length of the first thermoplastic fiber layer in the regions X1 and X1,2 are equal to the length of the second thermoplastic fiber layer in the region X1,2 and different to the length of the second thermoplastic fiber layer in the regions X1. This embodiment of the carrier material also forms a first part of a form-fit connection. It is possible, that the second thermoplastic fiber layer in the region X1 is longer than the first thermoplastic fiber layer in the regions X1 and X1,2 and the second thermoplastic fiber layer in the region X1,2 (shown), but also the reversed case is envisaged (like a negative form of the first part of the form-fit connection, not shown).

Figure 9:
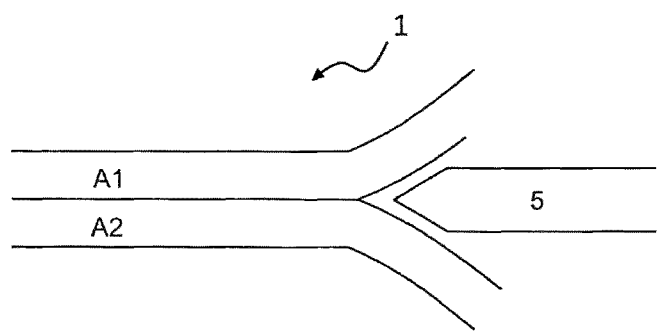
FIG. 9 shows schematically a splitting step of a first thermoplastic fiber layer and a second thermoplastic fiber layer.

FIG. 9 shows schematically a splitting process. The carrier material 1 comprises a first thermoplastic fiber layer A1 and a second thermoplastic fiber layer A2. A splitting device 5 separates the first thermoplastic fiber layer A1 and the second thermoplastic fiber layer A2 partially from each other to form an upper part originating from the first thermoplastic fiber layer A1 and a lower part originating from the second thermoplastic fiber layer A2, and the upper part or the lower part is removed, preferably by cutting. In a not shown embodiment, the upper part can comprise solely a part, of the originating first thermoplastic fiber layer A1 or the upper layer comprises the first thermoplastic fiber layer and a part of the second thermoplastic fiber layer, thus the lower part can comprise solely a part of the originating second thermoplastic fiber layer A1 or the lower part comprises the second thermoplastic fiber layer and a part of the first thermoplastic fiber layer. Whereby the first thermoplastic fiber layer A1 and the second thermoplastic fiber layer A2 of the carrier material 1 forms a first part of a form-fit connection (like FIGS. 4 to 7). The splitting device 5 is part of a splitting machine. For example the company Fortuna GmbH sold such splitting machines. Other methods then splitting and cutting are included to realize the described first part of a form-fit connection (like puzzle parts).

Figure 10:
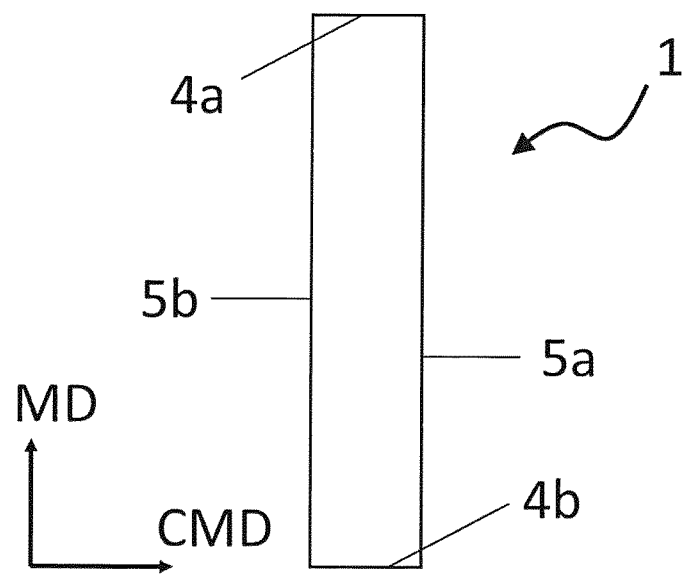
FIG. 10 shows a top view of a carrier material.

FIG. 10 shows a top view of a carrier material 1 having four boundaries (4a/b, 5a/b). A first boundary of the carrier material 1 is the beginning 4a of the carrier material 1 in machine direction MD. A second boundary of the carrier material 1 is the termination 4b of the carrier material 1 in machine direction MD. Further, the carrier material comprises a third boundary 5a on one side of the carrier material 1 in cross machine direction CMD, and a fourth boundary 5b on another side of the carrier material 1 in cross machine direction CMD.

Figure 11:
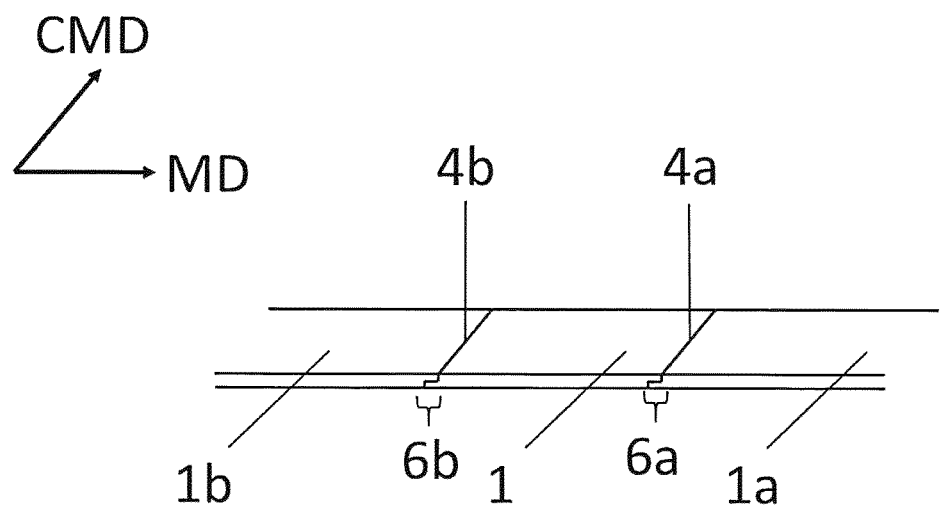
FIG. 11/12 show perspective views of schematic drawings of a carrier material connected to a second and a third carrier material.

FIG. 11 shows a carrier material 1, which is connected at its beginning 4a to a second carrier material 1a in machine direction MD. The connection is established at connecting area 6a. Further, the carrier material 1 is also connected at its termination 4b to a third carrier material 1b in machine direction MD, wherein the connection is established in the connecting area 6b.

Figure 12:
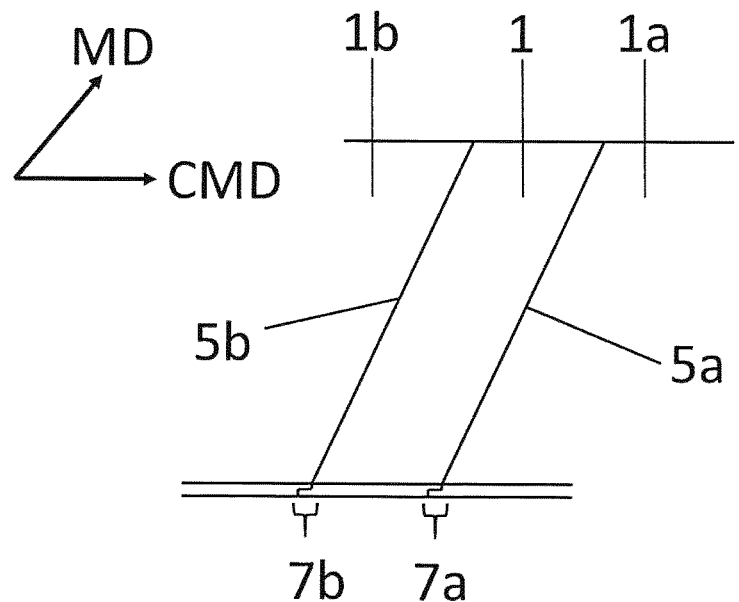

FIG. 12 shows a carrier material 1, which is connected at its one side 5a to a second carrier material 1a in cross machine direction MD. The connection is established at connecting area 7a. Further, the carrier material 1 is also connected at its other side 5b to a third carrier material 1b in cross machine direction CMD, wherein the connection is established in the connecting area 7b.

Figure 13:
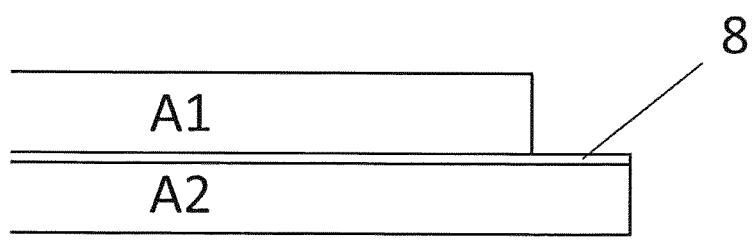
FIG. 13 shows a side view of a carrier material.

FIG. 13 shows a side view of a composite material 1 comprising a first thermoplastic fiber layer A1 and a second thermoplastic fiber layer A2, wherein a scrim 8 is arranged between the first thermoplastic fiber layer A1 and the second thermoplastic fiber layer A2.

The invention claimed is:

1. A carrier material comprising at least
   a first thermoplastic fiber layer and
   a second thermoplastic fiber layer,
   wherein the carrier material is capable of impregnation by an impregnating material,
   wherein the first thermoplastic fiber layer and the second thermoplastic fiber layer are nonwoven thermoplastic fiber layers,
   wherein fibers in the at least first and/or second thermoplastic fiber layer of the carrier material are filaments, and
   wherein at least a part of the first thermoplastic fiber layer and/or the second thermoplastic fiber layer, at at least one boundary of the carrier material, is removed from the carrier material such that a density of a remaining part of the first thermoplastic fiber layer and/or the second thermoplastic fiber layer is maintained, to provide a first part of a form-fit connection.

2. The carrier material according to claim 1, wherein a part of the first thermoplastic fiber layer and/or second thermoplastic fiber layer at at least two boundaries of the carrier material is removed.

3. The carrier material according to claim 1, wherein a part of the first thermoplastic fiber layer and/or second thermoplastic fiber layer of opposing boundaries of the carrier material is removed.

4. The carrier material according to claim 1, wherein the thickness of a first part of a connecting area is 0% to 90% of the thickness of the remaining carrier material, where a part of the first thermoplastic fiber layer and/second thermoplastic fiber layer is removed.

5. The carrier material according to claim 1, wherein the length and/or the width of the first thermoplastic fiber layer and the second thermoplastic fiber layer differ of at least 0.5 cm.

6. The carrier material according to claim 1, wherein a scrim comprising warp threads and/or weft threads is comprised in the carrier material.

7. The carrier material according to claim 6, wherein the warp and/or weft threads of the scrim comprise high modulus fibers having a tensile modulus of at least 5 GPa.

8. The carrier material according to claim 1, wherein the first thermoplastic fiber layer and/or second thermoplastic fiber layer comprise at least one type of mono-component fibers or bicomponent fibers.

9. The carrier material according to claim 1, wherein the first nonwoven thermoplastic fiber layer and/or the second nonwoven thermoplastic fiber layer are three dimensional mats of extruded entangled filaments.

10. The carrier material according to claim 1, wherein the carrier material is connected to a second carrier material with a form-fit connection, wherein the carrier material is connected to the second carrier material at a connecting area that includes one of the at least one boundary of the carrier material from which at least a part of the first thermoplastic fiber layer and/or the second thermoplastic fiber layer has been removed, the connecting area having substantially no variation in thickness and/or density in comparison to a remainder of the carrier material.

11. The carrier material according to claim 10, wherein the connecting area includes a second part of the form-fit connection formed in the second carrier material, the first part and the second part of the form-fit connection being connected together in the connecting area.

12. The carrier material according to claim 10, wherein the connection area includes an inclined layer boundary.

13. A method of manufacturing a carrier material comprising the following steps:
   a. supplying a carrier material comprising at least a first thermoplastic fiber layer and a second thermoplastic fiber layer, wherein the first thermoplastic fiber layer and the second thermoplastic fiber layer are nonwoven thermoplastic fiber layers, wherein fibers in the at least first and/or second thermoplastic fiber layer of the carrier material are filaments, and wherein the carrier material is capable of impregnation by an impregnating material,
   b. removing from the carrier material at least a part of the first thermoplastic fiber layer and/or second thermoplastic fiber layer at at least one boundary of the carrier material such that a density of a remaining part of the first thermoplastic fiber layer and/or the second thermoplastic fiber layer is maintained, to provide a first part of a form-fit connection, and
   c. optionally rolling up the carrier material.

14. The method according to claim 13, wherein the removing of step b is made by skiving or by splitting and cutting.

15. The method according to claim 13, wherein the removing of at least a part of the first thermoplastic fiber layer and/or the second thermoplastic fiber layer is performed, such that the thickness of a first part of a connecting area is 0% to 90% of the thickness of the remaining carrier material.

16. The method according to claim 13, wherein the length and/or the width of the first thermoplastic fiber layer and the second thermoplastic fiber layer differs of at least 0.5 cm.

17. The method according to claim 13, wherein the carrier material further comprises a scrim located between the first thermoplastic fiber layer and the second thermoplastic fiber layer.

18. The method according to claim 13, wherein the first nonwoven thermoplastic fiber layer and/or the second nonwoven thermoplastic fiber layer are three dimensional mats of extruded entangled filaments.

* * * * *